June 9, 1959

H. K. SWITZER 2,889,655

FISHING LINE RETRIEVER

Filed June 6, 1957

INVENTOR.
Harold K. Switzer.
BY
Wood, Herron & Evans.
ATTORNEYS.

United States Patent Office 2,889,655
Patented June 9, 1959

2,889,655
FISHING LINE RETRIEVER
Harold K. Switzer, Cincinnati, Ohio
Application June 6, 1957, Serial No. 663,930
4 Claims. (Cl. 43—17.2)

This invention relates to fishing equipment, and it is directed in particular to a retrieving device which may be used by a fisherman to salvage his fishing line when his lure becomes caught upon some underwater object. The retrieving device of this invention has particular utility when the fisherman is using spinning equipment, inasmuch as the line employed is so light that it cannot withstand the pull usually required to free a snagged lure. It will be apparent, however, that it is not limited in utility to this specific type of fishing line, and that it may be employed in any situation in which the line being used is worth salvaging. Additionally, although the device is primarily a line retriever, it is found that in almost all instances the lure is pulled free with the line so that it too is saved.

Generally, the retrieving device of this invention provides a means of connecting a stout cord to the swivel snap or other attaching device by means of which the lure is secured to the line. The stout cord then may be used to free the line, or the line and lure, without placing any stresses upon the line between the reel and lure. It is appreciated that this general scheme has been used in retrieving devices in the past. However, in the past, these devices were rather complicated, substantially more expensive to manufacture than the present one, and cumbersome to operate. The present device includes a simplified means for attaching it to the fisherman's line. This may be done with one hand. The device rides down on the fishing line to the lure. Upon reaching the lure the swivel snap is automatically engaged and gripped securely so that the device may be pulled, by means of a cord, to the surface bringing all of the line with it. If the lure is hopelessly caught upon an object, the swivel snap or the attaching eye on the lure must be broken. In most cases, however, the lure can be worked free and is not lost.

It may be seen, therefore, that one of the objectives of the present invention is to provide a line retrieving device which is fool-proof in operation.

Another objective of the invention is to provide a line retrieving device of the type set forth which is of exceedingly simple construction and which may be manufactured at low cost.

A further objective of the invention is to provide a line retrieving device which may be "propelled" to the outer end of a fishing line upon which it is engaged by means other than gravity. To fulfill this objective the device includes an angularly disposed surface or vane which reacts against the water when the fishing line upon which the device is engaged is swung back and forth to propel the device toward the outer end of the line and into engagement with the swivel snap or other fastening device.

Other objectives and features of the invention will be readily apparent to those skilled in the art from the following detailed description of the drawings in which.

Figure 1:
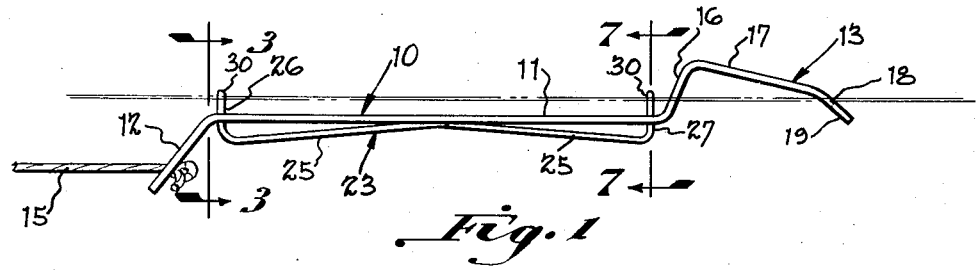
Figure 1 is a side elevational view of a retrieving device incorporating the principles of this invention.

The body of the line retriever is indicated generally at 10 and it preferably comprises an elongated, substantially narrow strip of rigid metal, such as stainless steel, which is formed into the configuration illustrated in Figure 1. As shown, the retriever includes a central flat or planar portion 11. A vane 12 is turned down from one end of the flat portion 11 at an angle which is approximately 45 degrees. The end opposite the vane constitutes a lure engaging head 13. The vane 12 preferably has a hole 14 in it to provide a means for tieing a stout cord 15 to the retriever. The lure engaging head 13 is formed by bending the metal of the body upwardly as at 16 and then bending it downwardly as at 17 to provide an angular, raised offset which slants down toward the right end of the device as it appears in Figure 1. Adjacent to its outer end, the head is turned down more sharply as at 18 to provide a nose 19 which terminates slightly below the plane of the upper surface of the central part 11 of the device. Between the bent-up portion 16 and the outer end, all of the head is offset above this plane.

Figure 2:
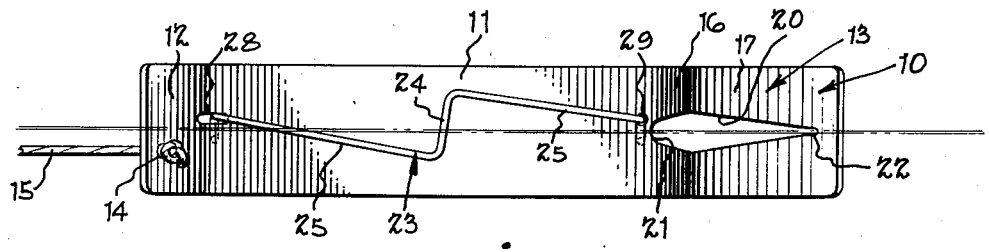
Figure 2 is a plan view of the underside of the device.

Referring to Figure 2, the head has an elongated diamond-shaped slot 20 cut into it, which slot is disposed on the longitudinal central axis of the device. The sides of the slot, starting adjacent to the central portion of the retriever, begin at a rounded end 21 and they flare outwardly from one another to the high point of the head, identified by the numeral 17, which is the start of the downwardly angulated forward portion. From this point, the two sides of the slot taper inwardly toward one another to terminate at a point 22 which is adjacent to the outer end of the head portion and just slightly below the bend designated 18 in Figure 1. It may be seen therefore, that the forward part of the diamond-shaped slot constitutes a V, the apex of which terminates at point 22 adjacent to the forward end of the device and the two sides of which reside in a plane slanting upwardly and backwardly toward the body of the device.

Figure 3:
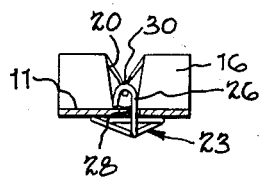
Figure 3 is a cross sectional view taken on the line 3—3 of Figure 1.
Figure 4:
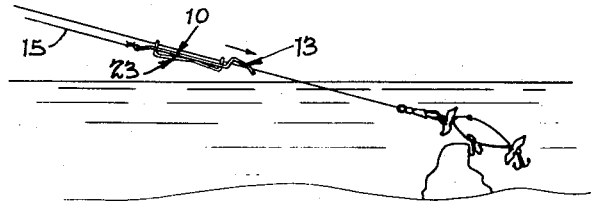
Figure 4 is a diagrammatic side elevational view showing the device engaged upon a fishing line.
Figure 5:
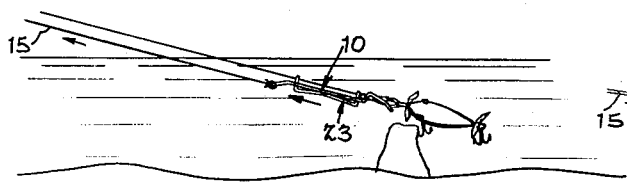
Figure 5 is a view similar to Figure 4 showing the device at the end of the line and engaged for retrieving the line.
Figure 6:
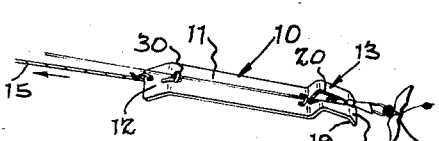
Figure 6 is a perspective view illustrating the manner in which a swivel snap is engaged by the retriever.
Figure 7:
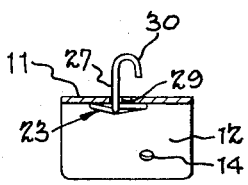
Figure 7 is a cross sectional view taken on the line 7—7 of Figure 1.

The device is fastened to a fishing line by means of a wire spring designated generally 23. This spring includes a central run 24 which resides up against the underside of the central portion of the retriever. Two arms 25—25 extend from this central run toward the opposite ends of the device. The angles between the two arms and the central run are slightly less than 90 degrees as shown. In addition, the two arms are angulated downwardly away from the underside of the device as shown in Figure 1. The two outer ends of the arms designated 26 and 27 are straight initially, being turned up at approximately 90 degrees. One of the ends, indicated at 26 extends through a short slot 28 in the retriever adjacent to the vane 12. The opposite end, designated 27 extends up through a hole 29. Both ends after being inserted through the slot, in the one case, and the hole, in the other case, are bent over to provide two U-shaped eyes or hooks 30—30. The tension on the spring is such that the free ends of the two hooks normally are pressed down against the upper surface of the retriever. See Figure 3. However, the free ends of the hooks may be lifted away from the surface, as shown in Figure 7 by pressing the arm upwardly immediately below the hooked end. When thus lifted, the two eyes or hooks may be engaged over a fishing line as shown in Figures 1 and 2 so that the line extends through both eyes and longitudinally of the slot 20.

When a lure or hook is caught in deep water, or at a place close to the fisherman, such that the angle the line makes relative to the surface of the water is a steep one, the retriever may be engaged on the line and then dropped so that it slides down the line by gravity until it strikes the lure and stops. At this time, the forward, narrow end of the slot 20 is in position to engage the swivel snap. At this time a steady pressure can be exerted upon the swivel snap and upon the retriever to securely wedge the swivel snap into the narrow end of the slot. Then, by pulling on the stout cord 15 the line can be salvaged either with or without the lure depending upon how securely the lure is caught upon the underwater object. In a situation in which the line makes a very shallow angle to the surface of the water, such that the retriever does not readily slide upon the line once it meets the water, the line itself may be swung back and forth which causes the water to exert a force upon the angulated vane 12 such that it propels the retriever toward the end of the line. In either case, the retriever moves to the end of the line and the swivel snap becomes wedged in slot 20.

It will be appreciated that the retriever may be manufactured inexpensively from sheet metal, using known stamping and forming or bending techniques. Additionally, however, the retriever may be made from a heavy plastic or a combination of heavy plastic and metal, or it may be made as a casting or molding. Furthermore, if desired, the vane 12 may be omitted although, as explained, it has definite utility in the successful operation of the retriever in cases where it is necessary to rely upon means other than gravity to cause the retriever to move toward the outer end of the fishing line.

Having described my invention, I claim:

1. A device to retrieve a snagged fishing line having a swivel snap at the outer end thereof, said device comprising an elongated, unitary strip of metal including a flat body and a head which is bent up and then down to provide a nose portion which slants downwardly and forwardly away from the body, there being a longitudinally V-shaped opening in the nose portion in the area thereof above the plane of the body portion said opening terminating adjacent to the forward end of the nose portion at the apex of the V, means to slidably engage the device upon a fishing line with the line extending longitudinally of the top of the body and through the apex of the V, whereby the device may be slid to the outer end of the fishing line and the swivel snap wedged in the apex of the V, and a stout cord attached to the end of the device opposite the nose portion, the cord providing a means to pull upon the device without placing any strain upon the fishing line.

2. A device for retrieving a fishing line as set forth in claim 1 in which the end of the device opposite the nose portion thereof is turned downwardly at substantially a 45 degree angle to provide a vane adapted to react against the water when a fishing line upon which the device is slidably engaged is moved sideways through the water to propel the device toward the outer end of the line.

3. A device to retrieve a snagged fishing line as set forth in claim 2 in which the means to slidably engage the device upon a fishing line comprises a unitary wire spring residing at the underside of the planar body portion and having its opposite ends turn up and passing through apertures in said body portion, and a hook formed at each end of the wire spring, the respective hooks and the apex of the V being in alignment longitudinally of the device.

4. A device to retrieve a snagged fishing line having a swivel snap at the outer end thereof, said device comprising an elongated body having a head at the forward end thereof the major portion of which is above the upper surface of said body, said head including a portion slanting downwardly and forwardly and having a V-shaped opening therein, the apex of which terminates adjacent to the forward end of said head and the sides of which reside in a plane slanting upwardly and backwardly, and means to slidably engage the device on a taut fishing line such that the line passes lengthwise over the body and through the V-shaped opening at the apex thereof.

References Cited in the file of this patent

UNITED STATES PATENTS

| | | |
|---|---|---|
| 2,238,604 | Sabin | Apr. 15, 1941 |
| 2,586,073 | McKee | Feb. 19, 1952 |
| 2,597,229 | Cox | May 20, 1952 |

FOREIGN PATENTS

| | | |
|---|---|---|
| 998,282 | France | Sept. 19, 1951 |